United States Patent [19]

Posch

[11] 4,347,218
[45] Aug. 31, 1982

[54] APPARATUS FOR MAKING CARBON BLACK

[75] Inventor: Oskar Posch, Biberist, Switzerland

[73] Assignee: Anstalt Mura, Vaduz, Liechtenstein

[21] Appl. No.: 153,253

[22] Filed: May 27, 1980

Related U.S. Application Data

[62] Division of Ser. No. 936,764, Aug. 25, 1978, Pat. No. 4,246,232.

[30] Foreign Application Priority Data

Sep. 2, 1977 [CH] Switzerland .................. 10759/77

[51] Int. Cl.³ .................................................. C09C 1/00
[52] U.S. Cl. ............................................ 422/151; 422/156; 422/158; 422/49; 431/187; 431/189
[58] Field of Search ............... 431/265, 189, 187, 181; 422/202, 204, 205, 150, 151, 156, 158, 49; 423/450, 456, 458

[56] References Cited

U.S. PATENT DOCUMENTS

| | | | |
|---|---|---|---|
| 3,567,395 | 3/1971 | Henderson et al. | 422/150 |
| 3,667,893 | 6/1972 | Zenkner | 431/265 |
| 3,753,658 | 8/1971 | Henderson et al. | 422/150 |
| 3,922,335 | 11/1975 | Jordan et al. | 422/150 |
| 4,116,639 | 9/1978 | Fross | 422/153 |

Primary Examiner—Frank W. Lutter
Assistant Examiner—Chris Konkol
Attorney, Agent, or Firm—Frishauf, Holtz, Goodman & Woodward

[57] ABSTRACT

The disclosed apparatus is of the type in which feed units feed air and hydrocarbon material into a reaction chamber, where they react to form carbon black. A filter then removes the carbon black. Disclosed is the provision of a mixing chamber between the feed units and the reaction chamber. The mixing chambers pass through a demountable hollow reactor cover through which there is circulated a heat transfer fluid for controlling the temperature of the mixing chamber walls. The mixing chamber can be common to a plurality of feed units or be separate for each feed unit.

Also disclosed is a feed unit which has a vortex plate, an output nozzle, and a hydrocarbon spray nozzle, all mounted on a hydrocarbon supply tube which in turn is fixed to a demountable cover of the feed unit. This permits these components to be readily removed with the cover for replacement or service. The feed units can also have their temperature controlled by the heat transfer fluid for the mixing chambers.

3 Claims, 7 Drawing Figures

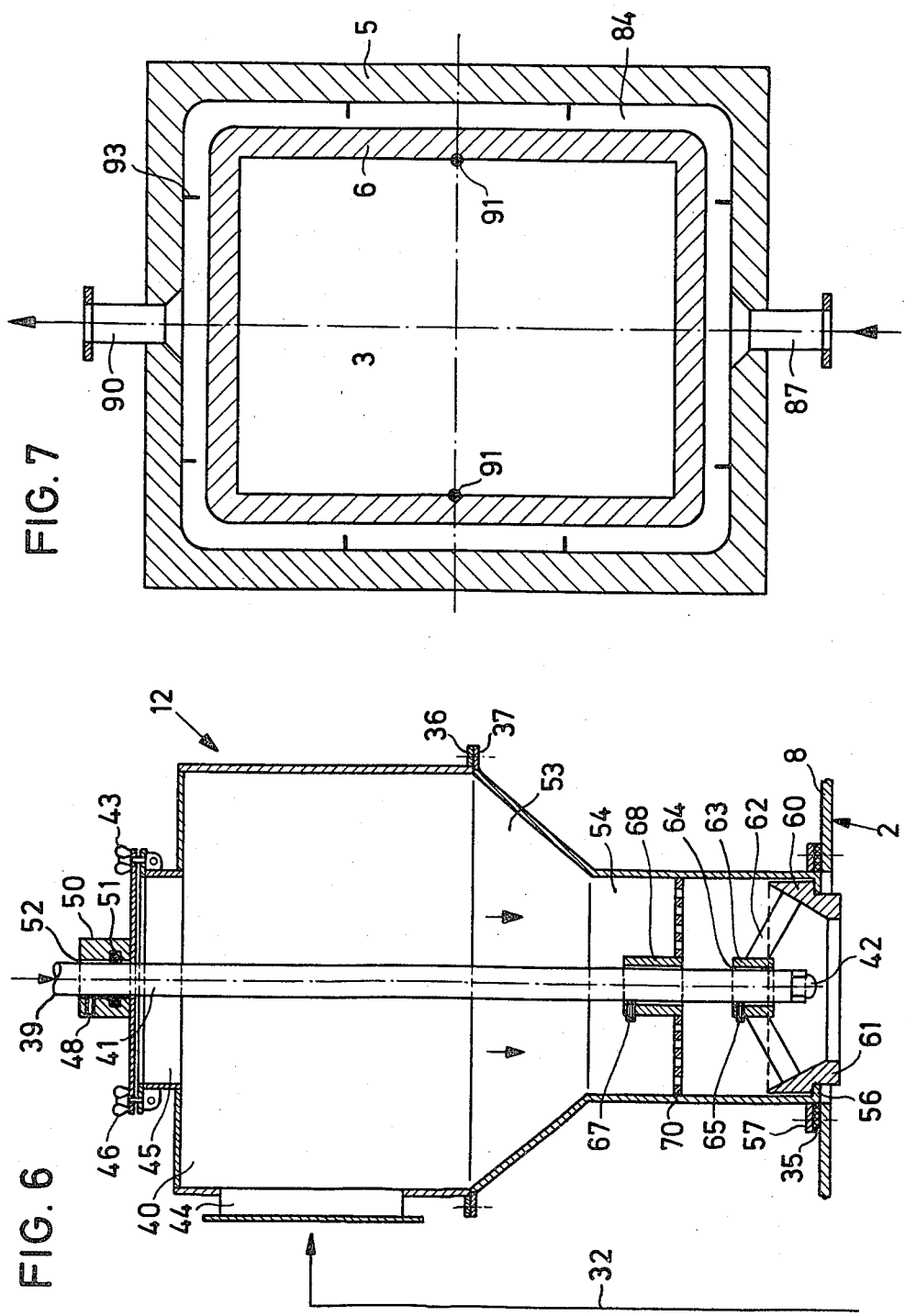

APPARATUS FOR MAKING CARBON BLACK

This is a division of application Ser. No. 936,764 filed Aug. 25, 1978 now issued as U.S. Pat. No. 4,246,232.

BACKGROUND OF THE INVENTION

The invention relates to an apparatus for the production of carbon black. The apparatus has a cylindrical or parallelepipedic reactor with a reaction chamber for carbon black formation. In the cover of the chamber there are provided a plurality of feed units for the metered supply of air from an air heating apparatus and of hydrocarbons from a preparation apparatus. On the discharge side of the reactor heat exchangers are provided for reducing the temperature of the waste of flue gases leaving the reactor and the produced carbon black. In a filter unit arranged behind the heat exchanger the carbon black is separated from the waste or flue gases.

Various designs of carbon black production apparatus are known. In one known type, fuel gases are produced separately in a reactor and are mixed with hydrocarbons sprayed in at a different part of the reactor for initiating the reaction processes. The decomposition of hydrocarbons and the formation of carbon black starts to a limited extent at temperatures of 700° to 800° C. (degrees Celsius) and reaches its optimum level at between approximately 1100° and 1400° C., depending on the desired carbon black quality.

Variants of this known type, in which fuel gases are introduced into the reactor separately from the hydrocarbons are known, and those variants particularly relate to the arrangement of the burner heads for producing the fuel gases and the nozzles for introducing the hydrocarbons for carbon black production. Furthermore, an additional carrier gas is added. In addition, for temperature control purposes, water is added in various ways, although this reduces the efficiency of an apparatus.

In the above types of carbon black production apparatus it is relatively difficult and also costly to produce different carbon black grades. This is due mainly to the fact that various operating parameters must be adapted to one another. On the one hand the fuel and air quantities for producing the fuel gases, and on the other hand the hydrocarbon quantities, as well as optionally the carrier gas and water quantities have to be regulated and matched to one another. If a carrier gas or water and/or water vapor are added, then additional reactions occur with the other components. Thus, with the known construction of a carbon black production apparatus, few carbon black grades can be produced in an economical manner. This is an important disadvantage, because it is desirable to be able to produce the particular carbon black grade which is in demand.

It is one approach to reduce the number of operating parameters which have to be regulated. Thus, there is known a further type of carbon black production plant, in which the same hydrocarbons are used both for producing the heat of reaction and for producing the carbon black. This leads to a significant operational simplification, such as is described, for example, in the U.S. Pat. Nos. 2,643,182 and 2,144,971. However, this simplification does not lead to a rapid adaptation of the operation of the carbon black production apparatus to the production of different carbon black grades. As is known, for producing different carbon black grades it is necessary to adhere to different operating conditions and, in particular, to a specific hydrocarbon to air ratio. Carbon black is always produced in a reducing atmosphere, i.e. with a deficiency of air.

Since for the production of increasingly fine carbon black it is necessary to use an increasingly large proportion of air, the thermal loading of the reactor rises in proportion to the production of finer carbon black grades and therefore limits the range of carbon black grades which can be produced in the same apparatus. However, in the case of inadequate mixing of the two components air and hydrocarbon, the free oxygen introduced into the reactor is not completely combined. As a result, the carbon black quality is degraded.

SUMMARY OF THE INVENTION

The problem to which the present invention is directed is to so develop an apparatus for the production of carbon black of the type defined hereinbefore that there are less restrictions for the production of carbon black grades of different fineness, while in particular preventing thermal overstressing of the reactor in the intake area of the two components hydrocarbon and air.

In accordance with the present invention, this problem is solved in that the reactor, as viewed in the flow direction of the components, has a mixing chamber located in front of the reaction chamber. Around the mixing chamber is formed a fluid passageway, or conduit substantially at right angles to the flow direction. On the conduit there are arranged the feed units. As a result, when the conduit is subject to the action of a fluid, the operating conditions, particularly the temperatures which are advantageous to the mixing of the components air and hydrocarbon, can be kept approximately constant in the mixing chamber for any desired period.

BRIEF DESCRIPTION OF THE DRAWINGS

The present invention is described in greater detail hereafter relative to specific embodiments and with reference to the attached drawings.

FIG. 6 is a partially schematic vertical section through a feed unit such as those represented schematically for the apparatus of FIG. 1.

FIG. 7 is a partially schematic cross-section through a reactor such as that of FIG. 3 and having a cooling duct incorporated into the reactor wall.

DETAILED DESCRIPTION OF THE PREFERRED EMBODIMENTS

Figure 1:
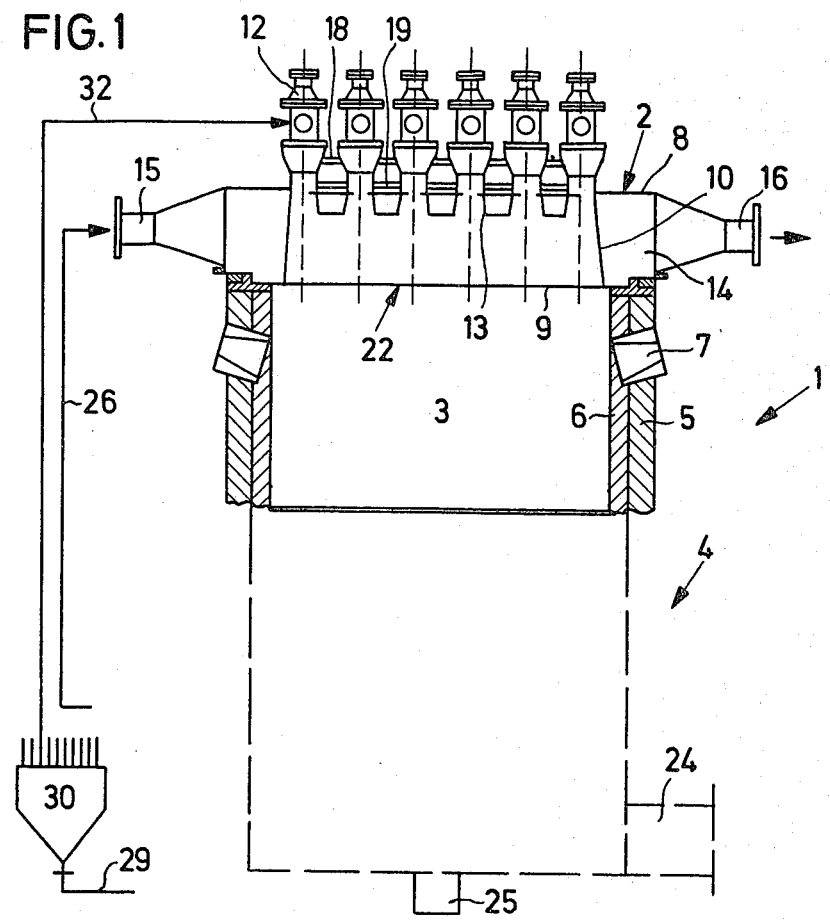
FIG. 1 is a partially schematic vertical section through a reactor of a carbon black production apparatus in accordance with a preferred embodiment of the present invention.

In FIG. 1 there is shown a reactor 1 of a carbon black production apparatus in accordance with one preferred embodiment of the present invention. The reactor 1 is positioned vertically, but could also be positioned horizontally. The carbon black production apparatus, of which reactor 1 forms the essential part, comprises a plurality of further components, namely a preparation apparatus for the hydrocarbons, an air heating apparatus for preheating the reaction air, a cooling apparatus for cooling the resulting reaction product, a filter unit in which the carbon black is separated from the waste or flue gases, a carbon black collecting and packaging mechanism, and a regulating device for regulating the operational parameters necessary for completely satisfactory operation. These further components of the apparatus are known and are therefore not described further in detail. Reference is made in this connection to description of such further components in, for example, the U.S. Pat. No. 3,369,870.

The reactor 1 has a reactor cover 2, a reaction chamber 3, and a heat exchanger 4. Schematically represented preheating burners 7 are incorporated into the wall of reaction chamber 3, which comprises an outer wall 5 and an inner lining 6. During the heating-up period of reactor 1, the preheating burners 7 are in operation, but are switched off during the normal carbon black production process. A not shown opening, closed by a flap, but which can open if overpressures occur, is provided in lining 6 and in outer wall 5.

The reactor cover 2, which is advantageously made from steel, e.g. stainless steel, is essentially a hollow structure with various built-in and built-on units. A plurality of feed units 12 are mounted on the top 8 of cover 2. The feed units 12 serve to supply hydrocarbon material and the reaction air to reaction chamber 3. In the construction according to FIG. 1 each feed unit 12 is provided with a short exhaust pipe connection 13 which extends up to a mixing chamber 22 and can e.g. be constructed as a cone. Feed units 12 and connection 13 extend in the direction of the longitudinal axis of reactor 1. A fluid passageway conduit 14, which is provided with an inlet connection 15 and an outlet connection 16, is arranged substantially at right angles to the longitudinal axis of reactor 1 in cover 2. Conduit 14 embraces the mixing chamber 22 and bounds it by walls 10, 11 shown in FIGS. 1 and 2. Due to the fact that they are arranged outside cover 2 and specifically on its top 8, the feed units 12 are not surrounded by conduit 14. However, it is also possible to permit connection 13 and/or feed units 12 to project into conduit 14. In any case, mixing chamber 22 and optionally connection 13 and/or further parts of feed units 12 are located in conduit 14 and can be either cooled or heated by a fluid flowing through conduit 14, so as to maintain the appropriate temperature for operation throughout the complete operating period.

Figure 2:
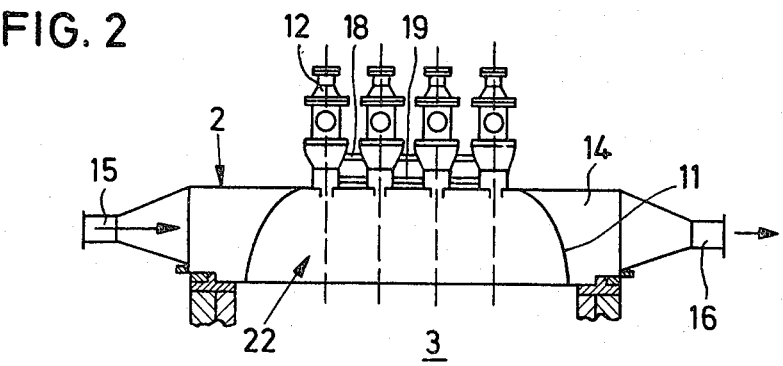
FIG. 2 is a partially schematic vertical section through the cover portion of a reactor similar to that of FIG. 1, but with a modified mixing chamber.

As can be gathered from the different arrangements shown in FIGS. 1, 2, 3 and 4, the feed units 12 can be interconnected by flow equalizing pipes 18, 19 and issue into mixing chamber 22, which, viewed in the flow direction of the reactor, is arranged in front of the reaction chamber 3. In FIG. 2, the feed units 12 have no connection and issue directly into mixing chamber 22.

Figure 3:
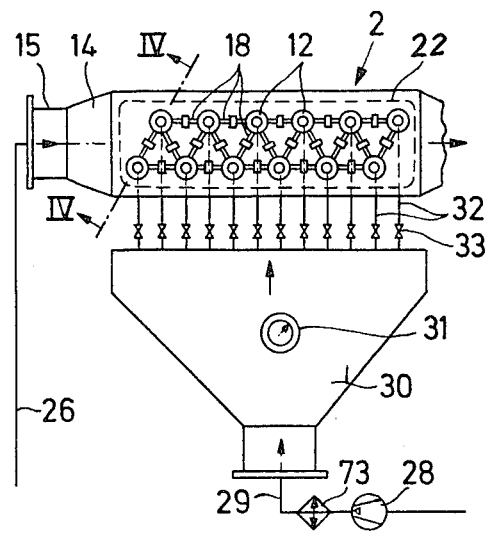
FIG. 3 is a schematic plan view of the cover portion of the reactor of FIG. 1 with an air supply indicated symbolically.

Reaction chamber 3 can have any desired cross-section and can e.g. be circular or rectangular. A rectangular cross-sectional configuration of reaction chamber 3 with two rows of feed units 12 is assumed for reaction 1 (FIG. 3). The cross-section of mixing chamber 22 approximately corresponds to the cross-section of reaction chamber 3.

Figure 5:
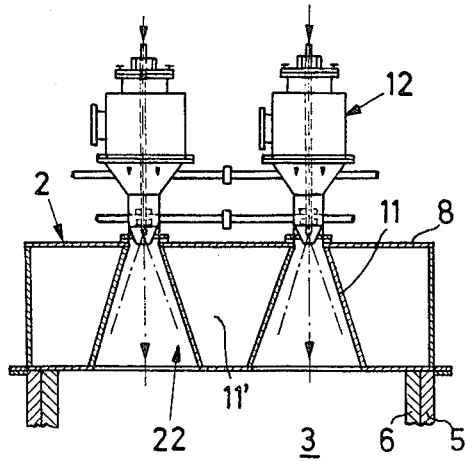
FIG. 5 is a schematic vertical section of two feed units of an apparatus such as that of FIG. 1 taken along the section line IV—IV indicated in the FIG. 3 and showing a modification of the mixing chamber so that it is subdivided into separate sections.

The mixing chamber 22 can optionally be subdivided into separate chambers 11' running in the direction of conduit 14', as is shown in the FIG. 5. The feed units 12 are arranged in rows, or concentrically on top 8 of cover 2. The subdivision of mixing chamber 22 takes place only to the extent which is necessary for maintaining favorable conditions for mixing the components.

The heat exchanger 4 comprises known individual, independent heat exchanger parts, which are not shown or described in detail. The heat exchanger 4 is positioned behind the reaction chamber, and through the former flow the reaction products, i.e. the carbon black produced and the fuel gases, whereby the temperature thereof is reduced. After flowing through heat exchanger 4, the reaction products pass into a pipe 24 and from there to the not shown filter unit. A carbon black discharging valve 25 for discharging already separated carbon black is arranged at the lowest point of heat exchanger 4.

Advantageously the inlet connection 15 of conduit 14 is connected with heat exchanger 4 via a pipe 26, which serves as the fluid supply pipe. As a result, the transverse flow conduit 14 can optionally be subject to the action of heated air and mixing chamber 22 can be kept at an approximately constant temperature, between approximately 500° and 700° C. (Celsius), preferably at approximately 600° C. A not shown cold air connection is provided on pipe 26, so that mixing chamber 22 can also be cooled.

FIG. 3 shows the supply of feed units 12 with reaction air. The feed units 12 are arranged on cover 2 in two rows parallel to conduit 14. Mixing chamber 22 is indicated by broken lines as an elongated chamber with rounded corners, which is surrounded by conduit 14 and can also be subdivided into separate chambers 11'.

The reaction air for feed units 12 is supplied by a symbolically represented feed device 28, which supplies the air which it sucks in via a pipe 29 and a not shown part of heat exchanger 4 to a distribution casing 30, located outside reactor 1. By means of a measuring device 31 arranged in casing 30, it is possible to measure the pressure produced by the supply device 28.

Connecting lines 32 lead to the feed units 12 from distribution casing 30. Each connecting line 32 contains a shutoff device 33, which can shut or constrict lines 32. Not shown throttle valves can be incorporated into lines 32 so that feed units 12 are subject to a uniform action. As a result, pipes 18 and/or 19 may be rendered superfluous if it is simultaneously ensured that the second component, the hydrocarbon, is precisely metered for each feed unit 12. This can be achieved, for example, by metering pumps and/or metering units which are connected to one another on a constrained motion basis and thus supply the same hydrocarbon quantity to each feed unit 12.

Figure 4:
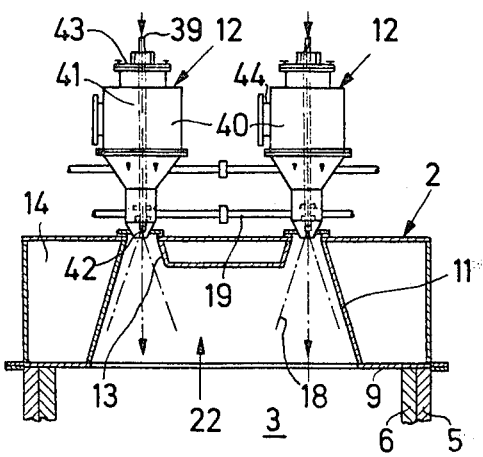
FIG. 4 is a schematic vertical section of two feed units of an apparatus such as that of FIG. 1 taken along the section line IV—IV indicated in the FIG. 3 and showing the feed units feeding into a common mixing chamber.

FIGS. 4 and 5 show sections through cover 2 with two differently arranged feed units 12. In the arrangement of FIG. 4, a support 13 is associated with each feed unit 12, so that there is a common mixing chamber. In the arrangement of FIG. 5 the feed units 12 feed into a mixing chamber 22 subdivided into separate chambers 11'. The cover 2 and/or the conduit 14 is sealed with respect to reaction chamber 3 by a base 9. As a result, it is possible for the conditions in mixing chamber 22 to be made such that it serves virtually only for the production of a homogeneous mixture from the hydrocarbons and the reaction air. This is ensured by the fluid stream, e.g. air or liquid passed through conduit 14.

The arrangement of the equalizing pipes 18 and 19 is best seen in FIG. 3. The two rows of feed units 12 arranged in cover 2 are staggered, which facilitates the arrangement of the pipes. The number of feed units 12 can be varied. If only a few feed units 12 of corresponding size are used, their disassembly and maintenance are time-consuming and costly, while a large number of small feed units is disadvantageous from the cost standpoint. Therefore, the number of feed units chosen is based on economic aspects. If the mixing chamber 22 is kept free from combustion processes, a homogeneous mixture of the two components can be obtained with a relatively small number of feed units 12, which represents the prior requirement for the complete combining of the oxygen in reaction chamber 3.

Each feed unit 12 (FIG. 6) has an input air chamber, or container 40 with a cylindrical cross-section and in whose longitudinal axis 39 there is arranged a hydrocarbon supply, or feed pipe 41 for the liquid hydrocarbons. A spray nozzle 42 is fitted at the end of pipe 41. Feed pipe 41 is fixed to a cover 43 on the top of air container 40. The reaction air is supplied by supply lines 32 (FIG. 3) whose ends are connected to an air connection 44 on the sidewall of air container 40.

In addition to the air connection 44, air container 40 has a cover connection 45 to which is fixed cover 43 with the aid of swivel pins 46 provided with butterfly nuts and which permit a rapid detachment of cover 43. Supply pipe 41 is adjustably fixed to cover 43 by means of a clamping screw 48. Clamping screw 48 is arranged in a boss 50 connected to cover 43 and in which is also provided a seal 51 for sealing the gap between supply pipe 41 and a bore 52 in boss 50. A not shown sealing means is also provided between cover connection 45 and cover 43.

On its bottom the air container 40 has mounted to it an output guide section with a conical portion 53 which passes into a cylindrical guide portion 54 having a smaller diameter than air container 40. At the free end of guide portion 54 is provided an inwardly projecting shoulder 56, while on the outer periphery of the output is arranged a mounting flange 57 with which feed unit 12 on cover 2, e.g. on its top 8, is fixed to a mounting flange 35 by means of screws and suitable sealing means.

If feed unit 12 with guide connection 54 is fitted into cover 2, mounting flanges 36, 37 can be provided for this purpose at the transition between air container 40 and conical connection 53. In this case, the fluid stream in conduit 14 also flows round the lower part of feed unit 12 comprising connections 53, 54.

An output restricting nozzle 60, which passes into an outlet connection 61 is supported on shoulder 56. The output nozzle 60 has radially directed webs 62, carrying a boss 63, in whose bore 64 supply pipe 41 with spraying nozzle 42 is secured by means of a setscrew 65. Above boss 63 supply pipe 41 carries a further boss 68 provided with a setscrew 67 and to which is fixed a vortex member, or body 70. The vortex body 70 can be constructed as a perforated plate, as shown in FIG. 6, or as a guide member with inclined webs.

The important factor is that as a result of this arrangement, the supply pipe 41, together with the output nozzle 60 and the vortex body 70, can easily be replaced by detaching cover 43. Depending on the desired grade of carbon black to be produced, the corresponding spraying nozzle 42 and nozzle 60, as well as vortex body 70, are fitted. Thereafter the supply pipe 41 is inserted in feed unit 12, cover 43 is reattached, and clamping screw 48 is tightened. An even faster replacement is obtained if complete fittings, comprising supply pipe 41, cover 43, vortex body 70, and nozzle 60 are prepared. In this way it is possible to change very rapidly from producing one carbon black grade to another.

Feed unit 12 can advantageously be constructed from sheet steel, so that the individual components together with pipes 18 and 19 can be interconnected by welding.

From the standpoint of the economic design of the carbon black production apparatus, it is advantageous if the heat of the waste gases produced in reaction chamber 3 can be used for heating the reaction air supplied to feed units 12 and the fluid used for flowing through conduit 14. For this purpose there is provided the heat exchanger 4, as shown in FIG. 1. Heat exchanger 4 must also be able to cool the waste gases flowing out of reaction chamber 3 to such an extent that they can be introduced into the filter unit without damaging the latter.

In FIG. 1, heat exchanger 4 follows directly onto reaction chamber 3. However, heat exchanger 4 and its component parts could also be arranged in some other way. The heat exchanger parts are located advantageously in a vertical section of the apparatus to obviate blockages due to carbon black deposits in the pipe systems.

FIG. 7 shows a variant of the construction of reaction chamber 3. Between outer wall 5 and inner wall 6 there is provided a duct 84 with guide surfaces 93 which can be used for cooling and/or heating reaction chamber 3. The cooling air enters at a connection 87 and escapes at a connection 90. The cooling air supply can be regulated by means of thermocouples 91 arranged on inner wall 6 of the reaction chamber.

The described apparatus functions in the following manner:

After the putting into operation of the preheating burner 7, the air heating apparatus and the hydrocarbon preparation apparatus are started up. After heating has taken place, the prepared liquid hydrocarbons and the preheated reaction air are passed through feed units 12 into mixing chamber 22, where the hydrocarbons are intimately mixed and vaporized, but not burned. The thus homogenized mixture passes into reaction chamber 3, in which part of the hydrocarbons are burned for producing the heat of reaction and the remainder is converted into carbon black. The resulting waste gases and the carbon black are passed through heat exchanger 4 and are introduced at a temperature of about 250° C. into the filter unit, in which the carbon black is separated, collected, and packed.

By means of the above-described apparatus, the temperature conditions in the region in which the air and hydrocarbons are mixed are very closely controlled. This permits an extension to the range of carbon black grades which can be produced, without the occurrence of operating faults. The extra expenditure involved, in the form of conduit 14 in cover 2 is small compared with the advantages which can be obtained. Moreover, the conduit 14 has an advantageous action on the service life of feed units 12, particularly their sensitive parts, e.g. the spraying nozzles 42. Its use makes it possible to operate the apparatus continuously.

If the combustible waste gases leaving the filter unit are to be further treated, e.g. purified, this can be done by means of equipment known in the furnace art.

I claim:

1. Apparatus for production of carbon black, the apparatus being of a type having:
   a reactor including a reaction chamber for carbon black formation and an overall cover;
   a plurality of unjacketed feed units mounted to said overall cover, each equipped for separately supplying air to said reaction chamber from an air supply apparatus and spraying hydrocarbon material into the air near a discharge end of the feed unit;
   a heat exchanger provided on the discharge side of said reactor for reducing the temperature of the reactor output gases and the carbon black produced therein; and
   a means on the discharge side of said heat exchanger for delivering the carbon black from the reactor,
   each of said units comprising:
   an input air chamber section having an air supply inlet and being open at its output end, and further comprising a coverable opening and a demountable cover therefor opposite its output end;
   an output guide section having an open input end mounted to the open output end of said input air chamber and tapering down to a cylindrical portion narrower than said input air chamber;
   a hydrocarbon supply pipe extending through said air input chamber and through said output guide section and isolating air in said input air chamber from hydrocarbon material;
   a spray nozzle mounted to said supply pipe for spraying hydrocarbon material into air passing through said narrower cylindrical portion of said output guide section;
   a vortex member having restricting flow openings and demountably affixed to said supply pipe within said narrower cylindrical portion of said output guide section; and
   an air output restricting nozzle demountably affixed to said supply pipe and removably mounted to said output guide section adjacent the output of said output guide section;
   said supply pipe, spray nozzle, vortex member and output restricting nozzle being connected together with said cover as an interconnected unit, and being proportioned to feed reagent air and hydrocarbon for production of a particular grade of carbon black in said apparatus, and said interconnected unit being removable from the feed unit through said coverable opening of said input air chamber to permit easy demounting of said vortex member, said air output restricting nozzle and said spray nozzle from said supply pipes.

2. The apparatus of claim 1, further comprising a plurality of flow equalization pipes interconnecting the interiors of the output guide sections of said plurality of feed units.

3. The apparatus of claim 1, wherein the total cross-sectional area presented by openings in said vortex member and the total cross-sectional area presented by openings in said output restricting nozzle are substantially of equal magnitude for each of said feed units.

* * * * *